US009305417B2

(12) United States Patent
Lee

(10) Patent No.: US 9,305,417 B2
(45) Date of Patent: Apr. 5, 2016

(54) AUTOMATIC SUPPLYING DEVICE OF DOOR HINGES

(71) Applicant: Kia Motors Corporation, Seoul (KR)

(72) Inventor: Jun Hee Lee, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 14/288,850

(22) Filed: May 28, 2014

(65) Prior Publication Data

US 2015/0187161 A1 Jul. 2, 2015

(30) Foreign Application Priority Data

Jan. 2, 2014 (KR) ........................ 10-2014-0000095

(51) Int. Cl.
*B65G 47/34* (2006.01)
*G07F 11/64* (2006.01)
*E05D 5/06* (2006.01)

(52) U.S. Cl.
CPC ................ *G07F 11/64* (2013.01); *E05D 5/062* (2013.01); *F25D 2323/024* (2013.01)

(58) Field of Classification Search
CPC ..................... B65G 2812/02752; B65G 17/08; B65G 17/12; B65G 65/00
USPC ............................ 198/801, 396, 482.1, 483.1
See application file for complete search history.

(56) References Cited

U.S. PATENT DOCUMENTS 1,736,011 A * 11/1929 Olson ...................... 198/370.01
4,293,063 A * 10/1981 Shields ...................... 198/483.1
5,348,141 A * 9/1994 Campbell et al. ............. 198/801
5,441,145 A * 8/1995 Knez ............................. 198/801
6,112,881 A * 9/2000 Osti et al. ................... 198/483.1

FOREIGN PATENT DOCUMENTS

KR 10-1997-0075189 12/1997
KR 10-2004-0037590 A 5/2004
KR 10-2006-0010969 2/2006
KR 10-0598857 7/2006
KR 10-2007-0014303 2/2007
KR 10-2010-0035328 A 4/2010

* cited by examiner

*Primary Examiner* — James R Bidwell
(74) *Attorney, Agent, or Firm* — Mintz Levin Cohn Ferris Glovsky and Popeo, P.C.; Peter F. Corless

(57) ABSTRACT

An automatic supplying device of door hinges includes: a door hinge supplying device having the door hinges loaded in upward and downward directions and supplying the door hinges; and a transferring device provided on a rear surface of the door hinge supplying device and automatically transferring the door hinges. The door hinge is automatically supplied when it is mounted, which makes it possible to improve work efficiency. In addition, a cylinder driving scheme is used, which makes it possible to decrease generation of noise at the time of supplying the door hinge, and a configuration for loading and moving the door hinge is simplified, such that a work space may be secured, and improving work convenience.

9 Claims, 11 Drawing Sheets

AUTOMATIC SUPPLYING DEVICE OF DOOR HINGES

CROSS-REFERENCE TO RELATED APPLICATION

This application is based on and claims under 35 U.S.C. §119(a) priority from Korean Patent Application No. 10-2014-0000095, filed on Jan. 2, 2014 in the Korean Intellectual Property Office, the disclosure of which is incorporated herein in its entirety by reference.

BACKGROUND (a) Field of the Invention

The present invention relates to an automatic supplying device of door hinges, and more particularly, to an automatic supplying device capable of automatically supplying a plurality of door hinges sequentially.

(b) Description of the Related Art

Generally, a door for a vehicle is mounted on a side panel of a vehicle body through a door hinge in order to be opened or closed on the side panel.

A process of mounting the door on the vehicle body in a vehicle body factory includes a process of mounting door hinges at front and rear pillars of the side panel of the vehicle, and a process of fastening the door to the door hinge.

In particular, devices for automatically mounting the door on the vehicle body and automatically mounting the door hinge on the vehicle body have been developed as various systems and have been utilized at a work site.

Although the device for mounting the door hinge on the vehicle body has been developed in the related art, a device for supplying the door hinge has not been developed. Therefore, conventionally, a worker manually loads and supplies the door hinge, such that work efficiency is deteriorated.

SUMMARY

One object to be achieved by the present invention is to provide an automatic supplying device of door hinges capable of automatically supplying the door hinges sequentially.

In one aspect of the present invention, there is provided an automatic supplying device of door hinges, including: a door hinge supplying device having the door hinges loaded in upward and downward directions and supplying the door hinges; and a transferring device provided on a rear surface of the door hinge supplying device and automatically transferring the door hinges.

The door hinge supplying device may include: a guide plate vertically installed and having a guide hole formed in the upward and downward directions; a plurality of door hinge fixing plates formed at both ends of the guide hole, respectively; and door hinge fixing pins protruding at both ends of the guide plate at which the door hinge fixing plates are formed.

The transferring device may include: a transferring block inserted into the guide hole of the door hinge supplying device and having one end protruding forward; and a moving device connected to the transferring block to move the transferring block in the upward and downward directions or forward and backward directions.

The transferring block and the door hinge fixing plate may be made of a magnetic material.

The moving device may include a first cylinder driving part for moving the transferring block in the upward and downward directions and a second cylinder driving part for moving the transferring block in the forward and backward directions.

The transferring device may further include a transferring rail connecting the moving device and the transferring block to each other, wherein the transferring rail is connected to the first cylinder driving part to move the transferring block in the upward and downward directions and is connected to the second cylinder driving part to move the transferring block in the forward and backward directions.

The transferring rail may be formed in a lengthwise manner in the transferring device in a vertical direction.

A front end portion of the transferring block may be provided with a coupling groove and a rear surface of the door hinge may be provided with a coupling bar.

Both ends of the door hinge may be provided with fixing holes into which the door hinge fixing pins are inserted.

The door hinge fixing pin may be fastened to the door hinge fixing plate by a bolt.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Exemplary embodiments of the present invention will be described in detail with reference to the accompanying drawings.

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms “a,” “an” and “the” are intended to include the plural forms as well, unless the context clearly indicates otherwise. It will be further understood that the terms “comprises” and/or “comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An automatic supplying device of door hinges according to an exemplary embodiment of the present invention is configured to include a door hinge supplying device 100 having door hinges H loaded therein and a transferring device 200 automatically transferring the door hinges H of the door hinge supplying device 100, as shown in FIGS. 1 to 3, 4*a* to 4*c*, and 5*a* to 5*e*.

Figure 1:
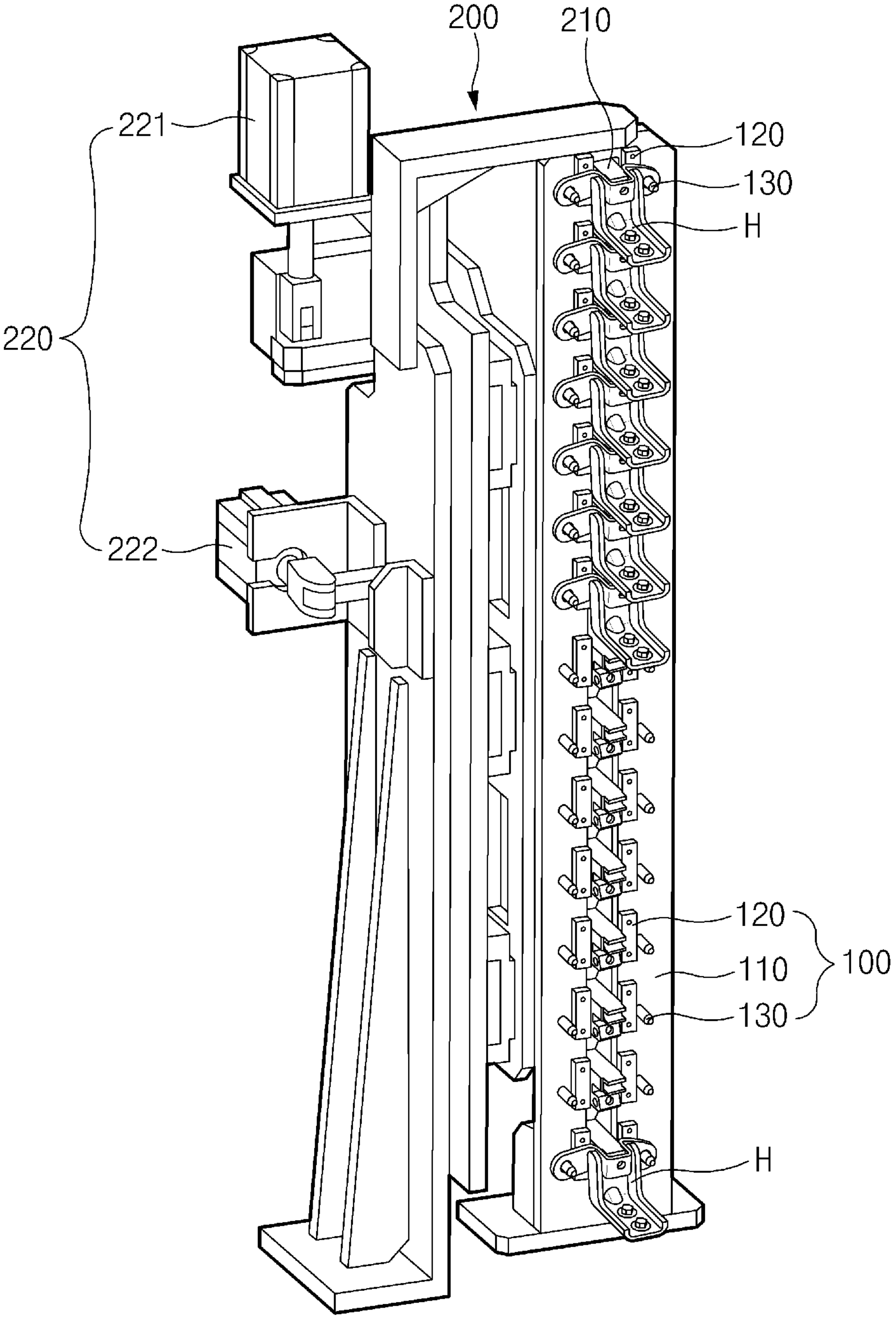
FIG. 1 is a perspective view showing an automatic supplying device of door hinges according to an exemplary embodiment of the present invention.
Figure 3:
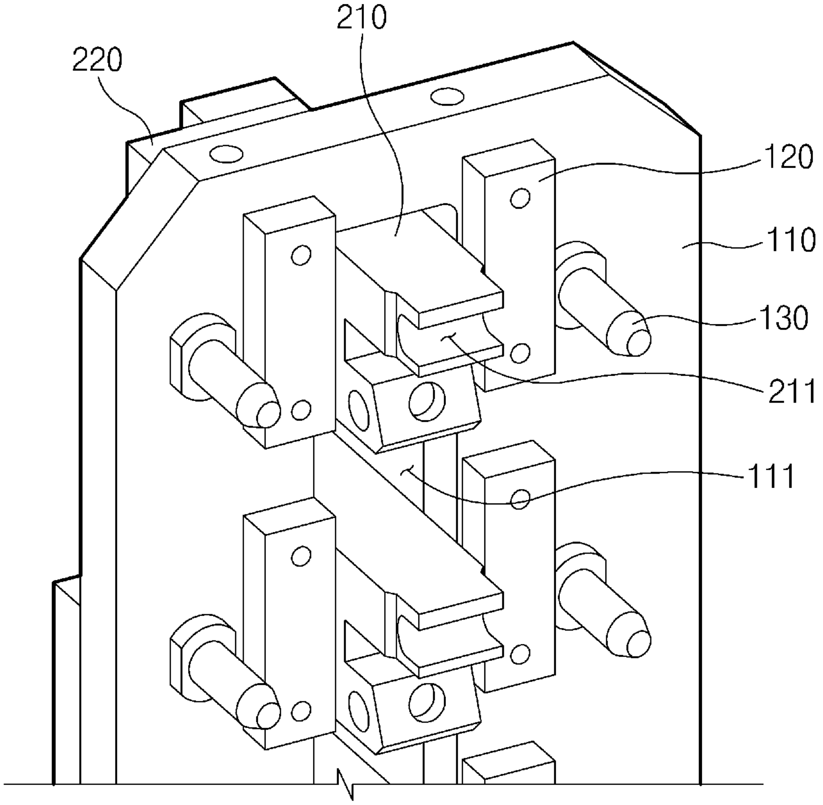
FIG. 3 is an enlarged perspective view of the automatic supplying device of FIG. 2 showing a state in which a door hinge is not loaded in the automatic supplying device according to an exemplary embodiment of the present invention.

As shown in FIGS. 1 and 3, the door hinge supplying device 100 may have the door hinges H loaded therein and may allow the door hinges H to be moved and supplied through the transferring device 200.

Preferably, the door hinge supplying device 100 includes a guide plate 110 having a guide hole 111 formed therein, and door hinge fixing plates 120 and door hinge fixing pins 130 fixing the door hinge H.

The guide plate 110 has a plate shape and is vertically installed. In this state, the guide hole 111 is formed in the guide plate 110 in upward and downward directions, such that the door hinge H may be loaded in the guide hole 111 and may be moved along the guide hole 111.

The door hinge fixing plates 120 may be formed at both ends of the guide hole 111 of the guide plate 110, respectively, to fix the door hinge H.

In particular, the door hinge H, which is temporarily attached and fixed to the door hinge fixing plates 120 for position setting, may be easily detachable from the door hinge fixing plates 120 when external force is generated by a transferring device 200 to be described below.

To this end, it is preferable that the door hinge fixing plate 120 is made of a magnetic material to allow the door hinge H made of steel to be temporarily attached to the door hinge fixing plate 120.

The door hinge fixing pins 130 may protrude at both ends of the guide plate 110 at which the door hinge fixing plates 120 are formed to fix the door hinge H in a state in which the door hinge H is fitted thereinto.

In particular, the door hinge H has fixing holes G formed in both ends thereof in order to be fastened to a vehicle body by bolts. The door hinge fixing pins 130 may be inserted into the fixing holes G to enable the door hinge H to be fixed to the door hinge supplying device 100.

In particular, the door hinge H may be separated in a state in which it is fixed to the door hinge supplying device 100 by the door hinge fixing pins 130 by an operation of the transferring device 200, which will be described below.

Further, it is preferable that a plurality of door hinge fixing plates 120 and a plurality of door hinge fixing pins 130 may be formed in the upward and downward directions to correspond to a plurality of door hinges H loaded along the guide hole 111 of the guide plate 110.

Preferably, the door hinge fixing pin 130 is fastened to the door hinge fixing plate 120 by a bolt.

The transferring device 200 is provided on a rear surface of the door hinge supplying device 100 and moves the door hinge H loaded in the door hinge supplying device 100 downward, thereby making it possible to supply the door hinge H to a door hinge automatic mounting device (not shown).

Figure 2:
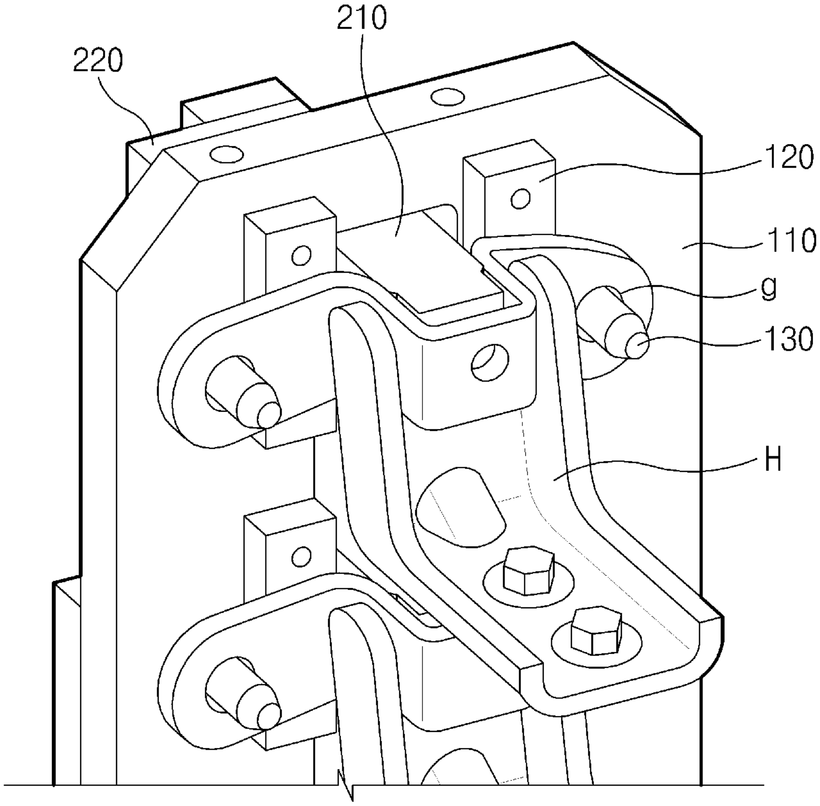
FIG. 2 is an enlarged perspective view showing certain parts of the automatic supplying device of FIG. 1.

As shown in FIGS. 1 to 3, the transferring device 200 includes a transferring block 210 inserted into the guide hole 111 of the guide plate 110 and having the door hinge H attached thereto and a moving device 220 moving the transferring block 210.

Figure 4A:
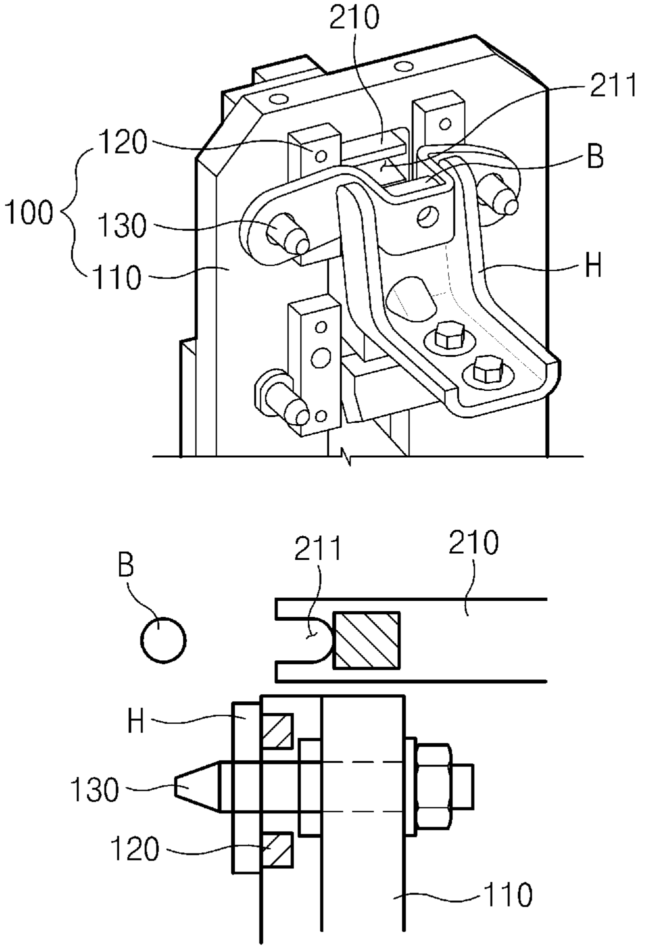
FIGS. 4*a* to 4*c* are perspective and schematic views showing different states in which the door hinge is detached from the automatic supplying device according to an exemplary embodiment of the present invention.
Figure 4B:
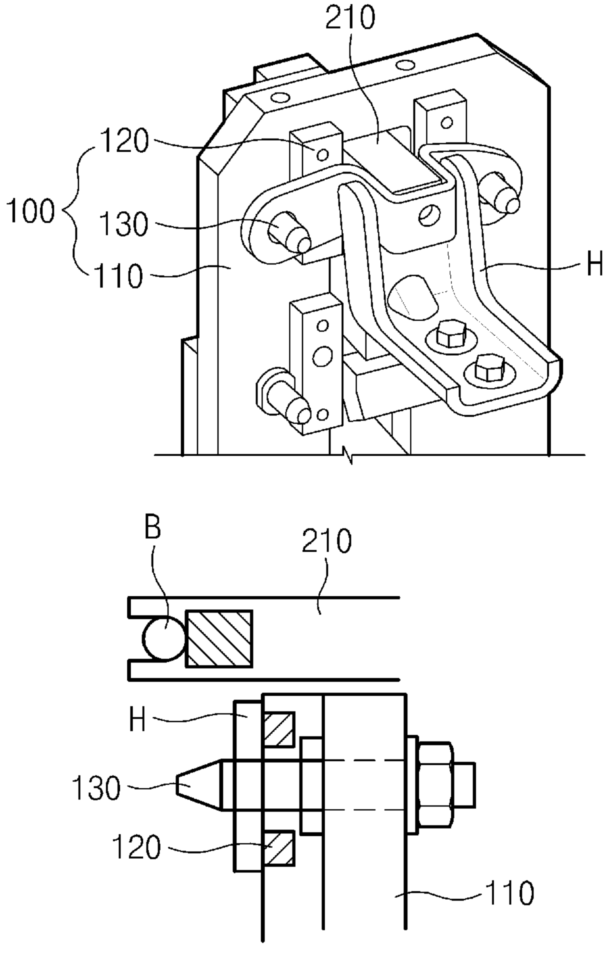
Figure 4C:
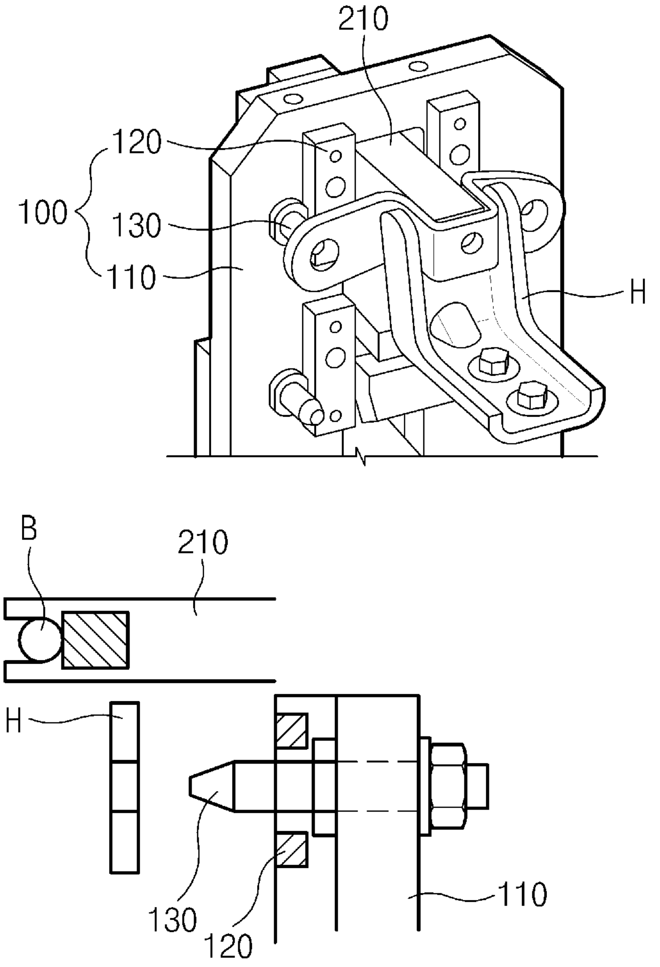
Figure 5A:
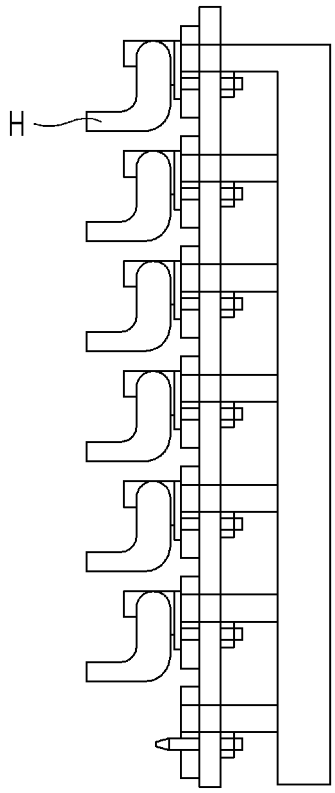
FIGS. 5*a* to 5*e* are schematic views showing different states in which the door hinge is transferred in the automatic supplying device according to an exemplary embodiment of the present invention.
Figure 5B:
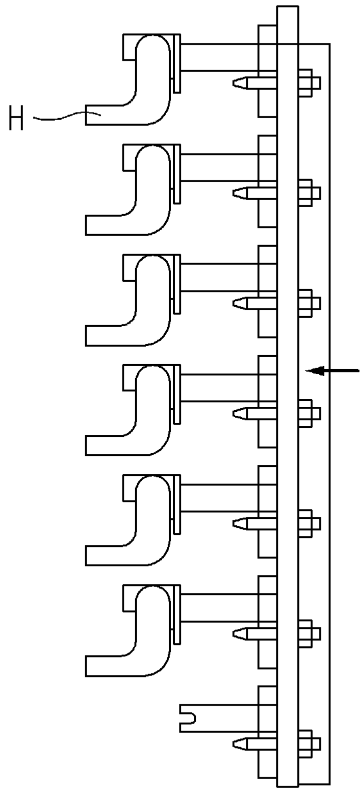
Figure 5C:
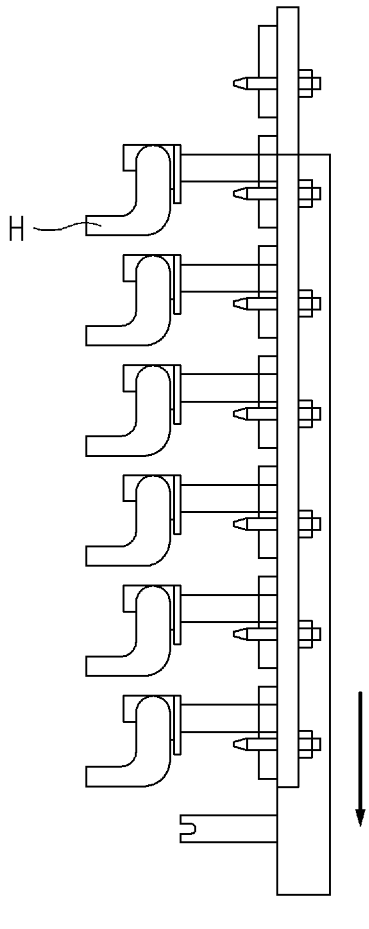
Figure 5D:
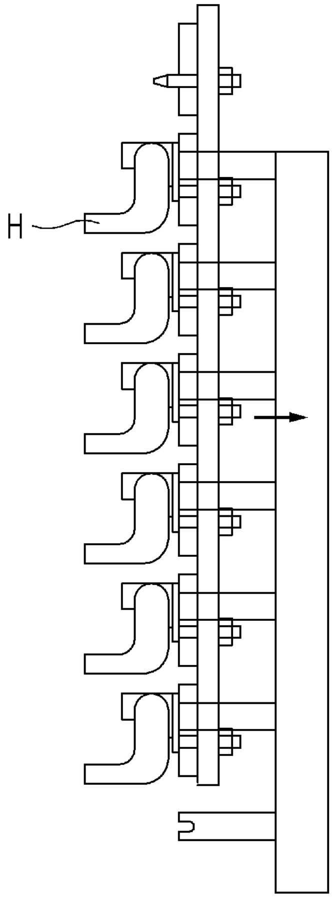
Figure 5E:
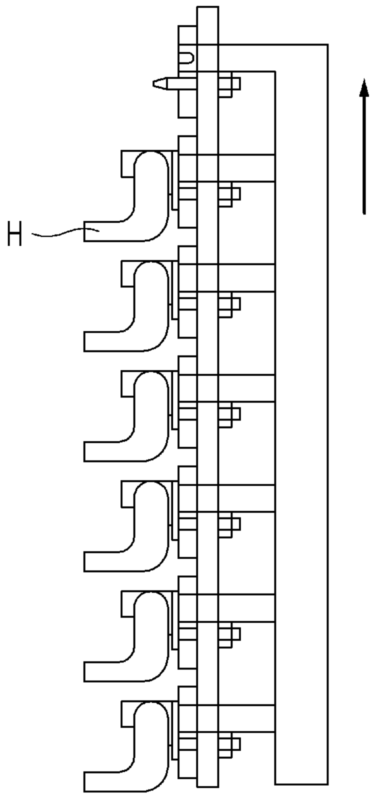

The transferring block 210 is inserted into the guide hole 111 of the guide plate 110 formed in the door hinge supplying device 100 as shown in FIGS. 4*a* to 4*c* and has one end protruding forward, such that a rear surface of the door hinge H is temporarily attached and fixed to the protrusion part.

In particular, the door hinge H attached to the transferring block 210 may be separated by separating a door hinge H loaded at the lowermost end by external force of the door hinge automatic mounting device (not shown) provided at a lower portion of the automatic supplying device of a door hinge according to an exemplary embodiment of the present invention.

It is preferable that the transferring block 210 is made of a magnetic material to allow the door hinge H made of steel to be temporarily attached to the transferring block 210.

The moving device 220 may be connected to the transferring block 210 to move the transferring block in the upward and downward directions or forward and backward directions.

In particular, the reason why the transferring block 210 is moved in the upward and downward directions by the moving device 220 is that the transferring block 210 should be moved upward in order to move the door hinges H loaded in the upward and downward directions downward and move remaining door hinges H downward after the moved door hinge H is extracted.

Further, the transferring device 200 includes a transferring rail 223 connecting the moving device 220 and the transferring block 210 to each other. In particular, it is preferable that the transferring rail 223 is connected to a first cylinder driving part 221 to move the transferring block 210 in the upward and downward directions and is connected to a second cylinder driving part 222 to move the transferring block 210 in the forward and backward directions. It is preferable that the transferring rail 223 is formed in a lengthwise manner in the transferring device 200 in a vertical direction.

As shown in FIGS. 5*a* to 5*e*, in order to move the transferring block 210 upward after the door hinge H is extracted, the transferring block 210 should be separated from door hinges H other than the extracted door hinge H. When the transferring block 210 is moved backward through the moving device 220 to this end, the door hinges H and the transferring block 210 are detached from each other.

Then, the transferring block 210 is again moved forward through the moving device 220 to thereby be coupled to the door hinges H and is then moved downward through the moving device 220, thereby making it possible to allow the door hinge disposed at the lowermost end among the loaded door hinges H to be extracted.

It is preferable that a front end portion of the transferring block 210 is provided with a coupling groove 211 and a rear surface of the door hinge H is provided with a coupling bar B to allow the transferring block 210 and the door hinge H to be easily detached from each other.

Further, the movement of the transferring block 210 in the upward and downward directions is enabled by an operation of the first cylinder driving part 221, and the movement of the transferring block 210 in the forward and backward directions is enabled by an operation of the second cylinder driving part 222.

As described above, the automatic supplying device of a door hinge according to an exemplary embodiment of the present invention includes the door hinge supplying device 100 having the door hinges H loaded therein and the transferring device 200 automatically moving the loaded door hinges H downward, such that the door hinges H loaded in the guide hole 111 of the door hinge supplying device 100 are maintained in a state in which they are fixed to distal ends of the transferring blocks 210, the door hinge fixing plates 120, and the door hinge fixing pins 130 that have magnetism. In this state, the moving device 220 of the transferring device 200 is moved downward, such that the door hinge disposed at the lowermost end among the loaded door hinges H is extracted by the separately provided door hinge automatic mounting device. Then, the moving device 220 is moved in the forward and backward directions and the upward and downward directions to allow the next door hinge H to be automatically supplied, thereby making it possible to improve work efficiency. In addition, a cylinder driving scheme is used, thereby making it possible to decrease generation of noise at the time of supplying the door hinge H, and a configuration of the device is simplified, such that a work space may be secured, thereby making it possible to improve work convenience.

As set forth above, according to an exemplary embodiment of the present invention, the door hinge is automatically supplied when it is mounted, thereby making it possible to improve work efficiency. In addition, a cylinder driving scheme is used, thereby making it possible to decrease generation of noise at the time of supplying the door hinge, and a configuration for loading and moving the door hinge is simplified, such that a work space may be secured, thereby making it possible to improve work convenience.

As described above, although the present invention has been described with reference to exemplary embodiments and the accompanying drawings, it would be appreciated by those skilled in the art that the present invention is not limited thereto but various modifications and alterations might be made without departing from the scope defined in the following claims.

What is claimed is:

1. An automatic supplying device of door hinges, comprising:

a door hinge supplying device having the door hinges loaded in upward and downward directions and supplying the door hinges; and a transferring device provided on a rear surface of the door hinge supplying device and automatically transferring the door hinges, wherein the door hinge supplying device comprises:

a guide plate vertically installed and having a guide hole formed in the upward and downward directions;

a plurality of door hinge fixing plates formed at both ends of the guide hole, respectively; and door hinge fixing pins protruding at both ends of the guide plate at which the door hinge fixing plates are formed.

2. The automatic supplying device of a door hinge according to claim 1, wherein the transferring device includes:

a transferring block inserted into the guide hole of the door hinge supplying device and having one end protruding forward; and a moving device connected to the transferring block to move the transferring block in the upward and downward directions or forward and backward directions.

3. The automatic supplying device of a door hinge according to claim 2, wherein the transferring block and the door hinge fixing plate are made of a magnetic material.

4. The automatic supplying device of a door hinge according to claim 2, wherein the moving device includes a first cylinder driving part for moving the transferring block in the upward and downward directions and a second cylinder driving part for moving the transferring block in the forward and backward directions.

5. The automatic supplying device of a door hinge according to claim 4, wherein the transferring device further includes a transferring rail connecting the moving device and the transferring block to each other, the transferring rail being connected to the first cylinder driving part to move the transferring block in the upward and downward directions and being connected to the second cylinder driving part to move the transferring block in the forward and backward directions.

6. The automatic supplying device of a door hinge according to claim 5, wherein the transferring rail is formed in a lengthwise manner in the transferring device in a vertical direction.

7. The automatic supplying device of a door hinge according to claim 2, wherein a front end portion of the transferring block is provided with a coupling groove and a rear surface of the door hinge is provided with a coupling bar.

8. The automatic supplying device of a door hinge according to claim 1, wherein both ends of the door hinge are provided with fixing holes into which the door hinge fixing pins are inserted.

9. The automatic supplying device of a door hinge according to claim 1, wherein the door hinge fixing pin is fastened to the door hinge fixing plate by a bolt.

* * * * *